Feb. 28, 1933.  C. A. ROEDER  1,899,294
HYDRAULIC BRAKE FOR AUTOMOBILE ENGINES
Filed July 20, 1932
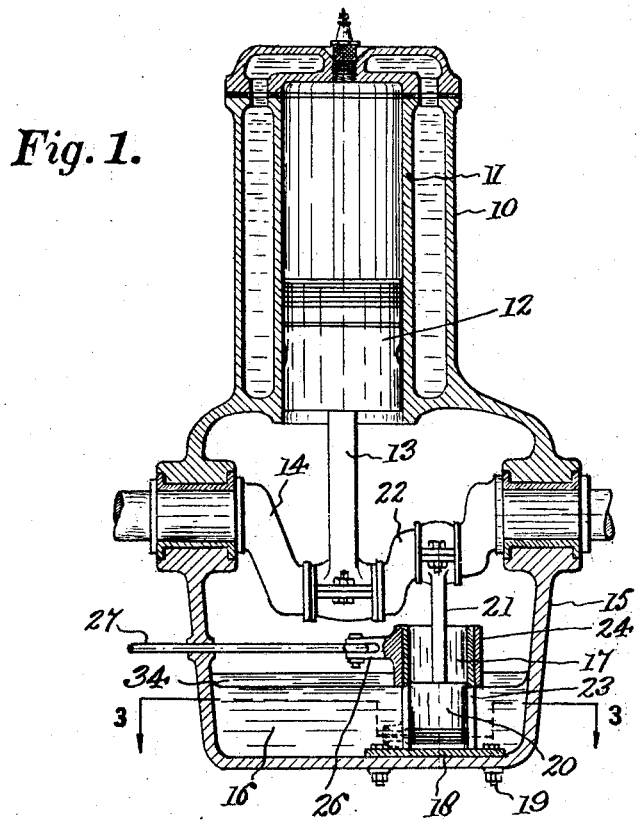
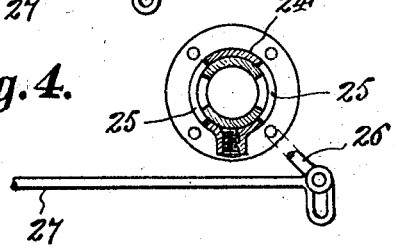
Inventor
C. A. Roeder
Attorney Patented Feb. 28, 1933

1,899,294

UNITED STATES PATENT OFFICE

CLYDE A. ROEDER, OF OMAHA, NEBRASKA

HYDRAULIC BRAKE FOR AUTOMOBILE ENGINES

Application filed July 20, 1932. Serial No. 623,677.

The present invention relates generally to brake mechanism adapted for application to motor vehicles, or other devices which are operated by an internal combustion engine.

An object of the present invention is to provide an improved construction of brake which utilizes the internal combustion engine and its connections to the wheels or other propelling device of the vehicle for checking the speed of the vehicle and for bringing the vehicle to a stop.

The invention further aims to provide a brake mechanism adapted to utilize the lubricating oil of the engine for checking the speed of the engine or bringing the engine to a stop and without waste of the lubricating oil, and by means of which admits of a relatively simple and economical construction which may readily be installed in or otherwise connected to the oil sump or crank case of the internal combustion engine.

The invention further aims to provide an improved and novel means for controlling the braking mechanism from a single source, and which also embodies a safety means to prevent damage or injury to the engine incident to the sudden checking of the speed thereof so as to prevent locking of the parts of the engine or other damage resulting from the imposition of sudden stresses or strains upon the crank case or movable parts of the engine and line shafting.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a longitudinal section taken through one type of internal combustion engine for the purpose of illustration, and discloses one embodiment of the brake mechanism of this invention applied thereto.

Figure 2 is a detail enlarged sectional view taken through a safety valve comprising part of the brake mechanism.

Figure 3 is an enlarged sectional view taken through the lower end of the braking mechanism substantially on the line 3—3 of Figure 1 and showing the parts adjusted for checking or stopping the operation of the engine, and Figure 4 is a similar view showing the parts in an oppositely adjusted position to admit the free operation of the engine.

Referring now to the drawing, the brake mechanism is disclosed as applied to a single cylinder engine, and it is understood that it is for the purpose of simplicity in disclosure only and that the invention is applicable to internal combustion engines having any desired number of cylinders, and it is also understood that the braking mechanism may be duplicated in any desired numbers according to the size of the engine and the work to be performed.

In Figure 1, 10 designates an internal combustion engine having a cylinder 11 in which operates a piston 12 connected by a connecting rod 13 to a crank shaft 14. The engine is provided with a crank case 15 in the lower portion of which is maintained a body of oil 16 in the usual manner.

The improved brake mechanism is shown in the present instance as enclosed within the crank case 15 although it may be disposed in any other suitable manner so as to have communication with or access to the body of oil 16 for operation as will subsequently appear. The brake mechanism has a cylinder 17 which may be mounted upon a base plate 18 secured by bolts 19, or the like, within the bottom of the crank case 15 in line with the crank shaft 14 but offset longitudinally from the main crank throw of the crank shaft.

A piston 20 is mounted in the cylinder 17 and is connected by a connecting rod 21 with a relatively short crank throw 22 which may be provided in the crank shaft 14. The piston 20 may be connected in any suitable manner to any moving part of the engine 10 so as to move the piston 20 when the engine is operated.

The brake cylinder 17 is provided at its lower end, beneath the normal surface level of the oil 16, with one or more lateral ports or openings 23 through which the oil 16 may pass back and forth into and out of the lower end of the cylinder 17 beneath the piston 20. The area of the port or ports 23 is equal substantially to the surface area of the piston 20 so that when the port or ports 23 are entirely open no resistance will be offered to the free reciprocation of the piston 20 and consequently the operation of the engine will not be checked.

Adjustable means is provided for controlling the size of the ports 23 and to either reduce the effective area thereof or to completely close the ports, according to the braking action desired. In the present embodiment this result is accomplished by a sleeve 24 which is rotatably mounted about the cylinder 17 and which may extend throughout the height of the cylinder 17 so as to dispose the uper end of the sleeve above the body of oil 16.

The sleeve 24 is provided in one or more sides with ports or openings 25 adapted to register with the ports 23 in the cylinder 17 when the sleeve 24 is turned for such adjustment.

Any suitable means may be provided for turning the sleeve 24, and in the present instance the sleeve is shown as having a forked arm or projection 26 at one side which is connected to a rod 27 which may be carried through the side of the crank case 15 and operated from any suitable point and through any suitable device for pushing and pulling the rod 27 to turn the sleeve 24. The rod 27 may thus be operated from the steering column or from any suitable point of easy access to the operator of the vehicle or engine. It will be noted from Figures 3 and 4 that the rod 27 is offset from the axis of the brake cylinder 27 so that the arm 26 may spring through an arch of desired length to effect the complete opening and closing of the ports 23 and 25 and also various intermediate adjustments for controlling the passage of the oil 16 back and forth from the lower end of the cylinder 17.

To prevent damage to the engine and parts connected thereto should the sleeve 24 be turned suddenly into a more or less closed position, a safety vent or outlet device is provided, and this device may be in the form of a safety valve carried on the sleeve 24 as shown particularly in Figure 2.

The sleeve 24 is provided with an outstanding hollow boss 28 near the lower end of the sleeve and in a closed wall thereof between the ports 25, as shown in Figures 3 and 4. The boss 28 is adapted to open into the lower end of the cylinder 18 when the sleeve 24 is more or less closed. The outer end of the boss provides a valve seat against which engages an outwardly opening valve 29 having a stem 30 about which is placed a spring 31. An adjustable nut or shoulder 32 is carried on the inner end of the stem 30 and engages one end of the spring 31. Inwardly extending fingers providing a shoulder 33 are carried by the boss 28 near its outer end and against which acts the opposite end of the spring 31 for normally holding the valve 29 to its seat. The spring 31 may be adjusted through the nut 32 to offer the desired resistance to the opening of the valve 29 until a predetermined excess pressure is obtained within the lower end of the cylinder 17. When this pressure occurs the valve 29 is opened against the tension of the spring so as to relieve the pressure and prevent locking of the movable parts of the motor and other mechanisms connected thereto. Of course, for normal operation the spring 31 is adapted to hold the valve 29 closed.

If desired the crank case 15 may be provided with one or more baffle plates 34 disposed substantially at the surface level of the body of oil 16 to maintain the oil about the lower end of the cylinder 17 when the engine is tilted, such as when the vehicle is inclined as on a hill, or the like.

From the above it is thought the operation will be apparent because during the normal running of the engine the short crank throw 22 reciprocates the piston 20 in the cylinder 17, and each time the piston 20 rises in the cylinder 17, oil may freely pass through the ports 23 from the crank case into the lower end of the brake cylinder 17. Downward movement of the piston 20 ejects the oil from the lower end of the cylinder 17 without resistance due to the relatively large area of the one or more outlet ports 23 in the cylinder.

When it is desired to check the speed of the engine the operator manipulates the rod 27 to turn the sleeve 24 and move the ports 25 of the sleeve more or less out of register with the ports 23 of the cylinder 17. Immediately the outflow of oil from the lower end of the cylinder 17 is retarded and consequently there is a checking in the operation of the piston 20.

This creates a drag upon the movable parts of the engine with the result that the speed thereof is reduced, and as the sleeve 24 is furthere turned to a closed position the braking action is proportionately increased until the engine may be entirely stopped. Should for some reason the sleeve 24 be closed too suddenly, the oil entrapped in the lower end of the cylinder 17 is permitted to escape under abnormal pressure, incident to momentum of the engine and connected parts or by the operation of the engine, through the safety valve 29. The spring 31 offers sufficient resistance to the opening of the safety valve, however, as to bring the braking action into play as soon as the excess pressure is relieved.

I am aware that some changes may be made in the general arrangements and combinations of the several devices and parts of my novel vehicle brake without departing from the scope of the present invention as set forth in the foregoing specification, and as defined in the appended claims. Hence, I do not limit my present invention to the exact arrangements and combinations of the parts as described in the foregoing specification, nor do I limit myself to the exact details of the construction of said parts, as illustrated in the accompanying drawing.

What is claimed is:

1. A brake mechanism for vehicles having an internal combustion engine with an oil sump, a brake cylinder communicating with the oil sump for normally receiving oil therefrom and returning oil to the sump, a piston in said cylinder connected to a movable part of said engine for operating the cylinder to pump the oil back and forth from the sump, and means for checking the passage of oil between the sump and the cylinder for retarding operation of the piston and the engine.

2. In combination with an internal combustion engine having a crank case adapted to support a body of oil for lubricating the engine, a brake cylinder communicating with the crank case, a piston in said cylinder, means for connecting the piston to a movable part of the engine for pumping oil back and forth between the crank case and the cylinder, and checking means for regulating the flow of the oil to and from the cylinder.

3. A brake for vehicles and the like having an engine with an oil sump, a brake cylinder communicating with the sump, a piston in the cylinder, a connection between the piston and the engine for operating the piston when the engine is operated, and flow control means between the cylinder and the oil sump of the engine for regulating the passage of oil into and out of the cylinder.

4. In brake mechanism for vehicles having an internal combustion engine and a crank case for containing a body of oil to lubricate the engine, a brake cylinder mounted in the crank case and having a port in its lower end through which oil in the crank case may pass to the cylinder, a piston in said cylinder, means connecting the piston to a movable part of the engine for operating the piston when the engine is operated, and a sleeve movably mounted about the cylinder and having a port therein, said sleeve adapted for adjustment on the cylinder to bring said ports in the cylinder and sleeve into desired relation for controlling the passage of oil back and forth from the cylinder.

5. In brake mechanism for vehicles and the like having an internal combustion engine with a crank case for containing oil to lubricate the engine, a crank shaft for the engine having a supplemental short crank throw, a cylinder mounted in the bottom of the crank case in line with said short crank throw and having ports in its lower end opening into the crank case to receive oil therefrom, a piston in said cylinder, a connecting rod between the piston and said short crank throw, and a sleeve slidably mounted about said cylinder and having ports therein adapted to register with the ports in the cylinder to admit free passage of oil back and forth through the cylinder, said sleeve adapted to be turned for checking the passage of oil into and out of the cylinder.

6. In brake mechanism for vehicles and the like having an internal combustion engine with a crank case for containing oil to lubricate the engine, a crank shaft for the engine having a supplemental short crank throw, a cylinder mounted in the bottom of the crank case in line with said short crank throw and having ports in its lower end opening into the crank case to receive oil therefrom, a piston in said cylinder, a connecting rod between the piston and said short crank throw, a sleeve slidably mounted about said cylinder and having ports therein adapted to register with the ports in the cylinder to admit free passage of oil back and forth through the cylinder, said sleeve adapted to be turned for checking the passage of oil into and out of the cylinder, and pressure relieving means communicating with the cylinder to prevent locking of the parts when said ports are closed.

7. In brake mechanism for vehicles having an internal combustion engine with a crank case adapted to contain a body of oil for lubricating the engine, a cylinder mounted in the bottom of the crank case and having ports through its lower end opening into the crank case, a piston in the cylinder, a connecting rod carried by the piston, a crank shaft for the engine having a short crank throw connected to said connecting rod, a sleeve rotatably mounted about the cylinder and having ports in its lower end, and an operating rod projecting through the crank case and connected to said sleeve for moving the same into one position for registering the ports of the sleeve with the ports of the cylinder and admit free operation of the piston, said rod adapted to operate the sleeve into an opposite position for moving said ports out of register to restrict the flow of oil through the ports and retard the operation of said piston.

8. In brake mechanism for vehicles having an internal combustion engine with a crank case adapted to contain a body of oil for lubricating the engine, a cylinder mounted in the bottom of the crank case and having ports through its lower end opening into the crank case, a piston in the cylinder, a connecting rod carried by the piston, a crank shaft for the engine having a short crank throw connected to said connecting rod, a sleeve rotatably mounted about the cylinder and having ports in its lower end, an operating rod projecting through the crank case and connected to said sleeve for moving the same into one position for registering the ports of the sleeve with the ports of the cylinder and admit free operation of the piston, said rod adapted to operate the sleeve into an opposite position for moving said ports out of register to restrict the flow of oil through the ports and retard the operation of said piston, said sleeve having a hollow boss at its lower end disposed between the ports of the sleeve to communicate with the cylinder when the ports are out of register, and an outwardly opening spring controlled check valve carried by the boss for operation to relieve excess pressure beneath the piston.

In testimony whereof, I have affixed my signature.

CLYDE A. ROEDER.